US008243406B2

(12) United States Patent
Asakura et al.

(10) Patent No.: US 8,243,406 B2
(45) Date of Patent: Aug. 14, 2012

(54) ESD PROTECTION DEVICE AND COMPOSITE ELECTRONIC COMPONENT OF THE SAME

(75) Inventors: Kensaku Asakura, Tokyo (JP); Yasuhiro Hirobe, Tokyo (JP); Atsushi Hitomi, Tokyo (JP); Takeshi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 145 days.

(21) Appl. No.: 12/654,251

(22) Filed: Dec. 15, 2009

(65) Prior Publication Data

US 2010/0157496 A1 Jun. 24, 2010

(30) Foreign Application Priority Data

Dec. 18, 2008 (JP) ................................ 2008-322435

(51) Int. Cl.

*H02H 9/00* (2006.01)
*H02H 1/00* (2006.01)
*H02H 1/04* (2006.01)
*H02H 3/22* (2006.01)
*H02H 9/06* (2006.01)

(52) U.S. Cl. ........................................ 361/56; 361/118

(58) Field of Classification Search ..................... 361/56
See application file for complete search history.

(56) References Cited

U.S. PATENT DOCUMENTS 4,031,498 A 6/1977 Hayashi et al.
6,191,928 B1 2/2001 Rector et al.
7,085,118 B2 8/2006 Inoue et al.
7,202,495 B2 * 4/2007 Unno .............................. 257/40
2004/0233606 A1 11/2004 Inoue et al.
2006/0125387 A1 6/2006 Adachi et al.
2008/0290977 A1 11/2008 Ito et al.
2009/0154052 A1 * 6/2009 Yoneda et al. ................ 361/220
2010/0176484 A1 * 7/2010 Asakura et al. ............... 257/531
2010/0270588 A1 10/2010 Kosowsky et al.

FOREIGN PATENT DOCUMENTS

JP A-2002-15831 1/2002
JP A-2002-538601 11/2002
JP A-2004-6594 1/2004
JP 2004-311877 11/2004
JP A-2007-48759 2/2007
JP A-2007-242404 9/2007
JP A-2007-265713 10/2007
WO WO 00/51152 A1 8/2000

OTHER PUBLICATIONS

Nov. 7, 2011 Office Action issued in U.S. Appl. No. 12/656,056.
Office Action issued in U.S. Appl. No. 12/656,056 dated May 16, 2012.

* cited by examiner

*Primary Examiner* — Dharti Patel
(74) *Attorney, Agent, or Firm* — Oliff & Berridge, PLC

(57) ABSTRACT

The present invention provides an ESD protection device and the like having improved durability against repeated use. An ESD protection device includes a base having an insulating surface, electrodes disposed on the insulating surface and facing but spaced apart from each other, and a functional layer disposed on at least between the electrodes. The electrodes have a multistage structure in which a gap between the electrodes is narrower toward the base.

6 Claims, 12 Drawing Sheets

ESD PROTECTION DEVICE AND COMPOSITE ELECTRONIC COMPONENT OF THE SAME

BACKGROUND OF THE INVENTION

1. Field of the Invention

The present invention relates to an ESD protection device and a composite electronic component thereof, and in particular, to an ESD protection device which is useful in a high-speed transmission system and which can advantageously be combined with a common mode filter.

2. Description of the Related Art

In recent years, size reduction and performance improvement of electronic apparatuses have been rapidly in progress. Furthermore, much effort has been made to increase transmission speed (an increased frequency exceeding 1 GHz) and to reduce driving voltage as typically seen in high-speed transmission systems such as USB2.0, S-ATA2, and HDMI. On the other hand, the withstand voltage of electronic components used in electronic apparatuses decreases consistently with the size reduction of electronic apparatuses and the reduced driving voltage therefore. Thus, it has been important to protect electronic components from overvoltage typified by electrostatic pulses generated when a human body comes into contact with a terminal of an electronic apparatus.

In order to protect electronic components from such electrostatic pulses, a method of providing a barrister or the like between the ground and a line to be subjected to static electricity has generally been used, and a method of adopting a surge absorber including long-lasting electrodes has been proposed (see Patent Documents 1 to 3). However, the use, in a high-speed transmission system, of the barrister or the like, which has a large electrostatic capacitance, not only increases a discharge starting voltage but also degrades signal quality.

On the other hand, an antistatic component with a low electrostatic capacitance has been proposed which includes an electrostatic protection material filled between opposite electrodes. For example, Patent Document 4 discloses an electric circuit protecting device (antistatic component) including a voltage varying polymer material disposed between electrodes by applying a polymer material containing conductive particles into the gap area between the electrodes by stencil printing and thermally treating and solidifying the polymer material. Furthermore, Patent Document 5 discloses an antistatic component including an electrostatic protection material layer formed between a pair of electrodes by, in order to enhance an electrostatic inhibition effect, kneading metal particles with a passive layer formed on the surface thereof, a silicone-containing resin, and an organic solvent to obtain electrostatic protection material paste and applying the electrostatic protection material paste to between the opposite electrodes by screen printing before drying. Moreover, Patent Document 6 discloses an electric circuit protecting device (antistatic component) including a voltage dependent resistor layer composed mainly of zinc oxide and formed by providing ceramic paste containing metal oxide, a resin component, and a solvent component, subjecting the ceramic paste to screen printing so as to fill the gap between electrode paste films, and burning the ceramic paste at a high temperature.

[Patent Document 1] Japanese Patent Laid-Open No. 2007-242404

[Patent Document 2] Japanese Patent Laid-Open No. 2002-015831

[Patent Document 3] Japanese Patent Laid-Open No. 2007-048759

[Patent Document 4] National Publication of International Patent Application No. 2002-538601

[Patent Document 5] Japanese Patent Laid-Open No. 2007-265713

[Patent Document 6] Japanese Patent Laid-Open No. 2004-006594

However, the antistatic components described in Patent Documents 4-6 cannot withstand repeated use; in the antistatic components, during discharge, electrodes may be damaged and short-circuited or the gap distance between the electrodes may vary, resulting in a significant variation in discharge starting voltage.

The present invention has been made in view of the above circumstances. An object of the present invention is to provide an ESD protection device offering improved durability against repeated use and a composite electronic component combined with the ESD protection device. Another object of the present invention is to provide an ESD protection device having a small electrostatic capacitance, a low discharge starting voltage, and excellent heat resistance and weather resistance, and allowing a further reduction in the thickness thereof, improvement of productivity, and a reduction in costs and a composite electronic component combined with the ESD protection device.

SUMMARY OF THE INVENTION

To accomplish the above-described object, the present inventors conducted earnest studies. The present inventors have thus found that in what is called a gap type ESD protection device including an electrostatic protection material filled between opposite electrodes, durability against repeated use can be improved by forming the electrodes such that end surfaces of the electrodes disposed on opposite each other via a gap have a multistage structure. The present inventors have thus completed the present invention.

That is, the present invention provides an ESD protection device including a base having an insulating surface, electrodes disposed on the insulating surface and facing but spaced apart from each other, and a functional layer disposed on at least between the electrodes, wherein the electrodes have a multistage structure in which a gap between the electrodes is narrower toward the base.

Here, in the specification, the term “durability” means performance evaluated based on the number of discharges occurring when electrostatic discharge tests are repeated in embodiments described below.

As a result of measurement of the characteristics of the ESD protection devices configured as described above, the present inventors have found that, compared to the conventional antistatic elements, the ESD protection devices have improved durability. The detail of the mechanism of this effect has not been clarified yet. However, for example, the mechanism can be assumed to be as follows.

In this kind of conventional gap type ESD protection devices, discharge typically occurs in a conductive path in which the resistivity between the electrodes arranged opposite each other exhibits the smallest value. According to the present inventor’s knowledge, during high-voltage discharge, for example, locally generated heat melts part of the electrodes, damaging the gap-side end surfaces of the electrodes. In contrast, the ESD protection device configured as described above is configured so as to have a multistage structure such that the gap (that is, the width) between the electrodes decreases (gradually) toward the base. This facilitates discharge in a base-side (lower) stage, and heat generated, during the discharge, by a (upper) stage formed over the base-side stage diffuses very efficiently. As a result, the electrodes are inhibited from being damaged during discharge, thus improving durability. However, the effects of the present invention are not limited to those described above.

Here, the functional layer is preferably a composite in which a conductive inorganic material is discontinuously dispersed in a matrix of an insulating inorganic material. Instead of the above-described conventional organic-inorganic composite film, a composite of an insulating inorganic material and a conductive inorganic material is thus adopted as an electrostatic protection material to significantly improve heat resistance and weather resistance against an external environment including temperature and humidity. Furthermore, such a composite can be formed by using a thin-film formation method for an inorganic material such as a sputtering method or a deposition method. Thus, compared to the forming of an organic-inorganic composite film of about several tens of μ by application based on stencil printing or screen printing and the following drying, the forming of the composite facilitates a reduction in film thickness, improves productivity, and reduces costs.

In the specification, the term "composite" used herein means a state in which a conductive inorganic material is dispersed in a matrix of an insulating inorganic material, and includes a concept in which not only a state in which a conductive inorganic material is uniformly or randomly dispersed in a matrix of an insulating inorganic material, but also a state in which clusters of a conductive inorganic material are dispersed in a matrix of an insulating inorganic material, that is, a state typically called a sea-island structure. Furthermore, the term "insulating" used herein means that the resistivity is greater than or equal to 0.1Ω·cm, and the word "conductive" means that the resistivity is smaller than 0.1Ω·cm. What is called "semi-conductive" is included in the former word "insulating" as long as the specific resistivity of a material in question is greater than or equal to 0.1Ω·cm.

Furthermore, the insulating inorganic material is preferably at least one species selected from the group consisting of $Al_2O_3$, $TiO_2$, $SiO_2$, ZnO, $In_2O_3$, NiO, CoO, $SnO_2$, $V_2O_5$, CuO, MgO, $ZrO_2$, AlN, BN, and SiC. These metal oxides are excellent in the insulating property, heat resistance, and weather resistance and thus functions effectively as a material forming the insulating matrix of the composite. As a result, the metal oxides can be formed into a high-performance ESD protection device that is excellent in the discharge property, heat resistance, and weather resistance. Moreover, the metal oxides are inexpensively available, and the sputtering method is applicable to these metal oxides. Thus, the metal oxides serve to improve productivity while reducing costs.

Moreover, the above-described conductive inorganic material is preferably at least one species of metal selected from the group consisting of C, Ni, Cu, Au, Ti, Cr, Ag, Pd, and Pt, or a metal compound thereof. By blending any of the metals or metal compounds in a matrix of an insulating inorganic material so that the metal or metal compound is discontinuously dispersed, a high-performance ESD protection device is obtained which is excellent in the discharge property, heat resistance, and weather resistance.

Another aspect of the present invention provides a composite electronic component effectively combined with the ESD protection device according to the present invention and including an inductor device and an ESD protection device that are provided between two magnetic bases, wherein the inductor device comprises an insulating layer composed of resin, and a conductor pattern formed on the insulating layer, the ESD protection device comprises an underlying insulating layer formed on the magnetic base, electrodes disposed on the underlying insulating film and facing but spaced apart from each other, and a functional layer disposed on at least between the electrodes, and the electrodes have a multistage structure in which a gap between the electrodes is narrower toward the magnetic base.

Moreover, yet another aspect of the present invention provides a composite electronic component effectively combined with the ESD protection device according to the present invention and including a common mode filter layer and an ESD protection device layer that are provided between two magnetic bases, wherein the common mode filter layer includes a first insulating layer and a second insulating layer both composed of resin, a first spiral conductor formed on the first insulating layer, and a second spiral conductor formed on the second insulating layer, and the ESD protection device layer includes a first ESD protection device connected to one end of the first spiral conductor, and a second ESD protection device connected to one end of the second spiral conductor, and wherein the first and second spiral conductors are formed on respective planes perpendicular to a stacking direction and arranged so as to be magnetically coupled together, and each of the first and second ESD protection devices comprises an underlying insulating layer formed on the magnetic base, electrodes disposed on the underlying insulating layer and facing but spaced apart from each other, and a functional layer disposed on at least between the electrodes, and wherein the electrodes have a multistage structure in which a gap between the electrodes is narrower toward the magnetic base.

The present invention provides an ESD protection device with an improved durability and a composite electronic component combined with the ESD protection device. Moreover, the present invention allows the heat resistance and weather resistance to be improved and enables films in the element and component to be thinned, compared to the prior art. As a result, the present invention can improve productivity and reduce costs.

DETAILED DESCRIPTION OF THE EMBODIMENTS

Figure 1:
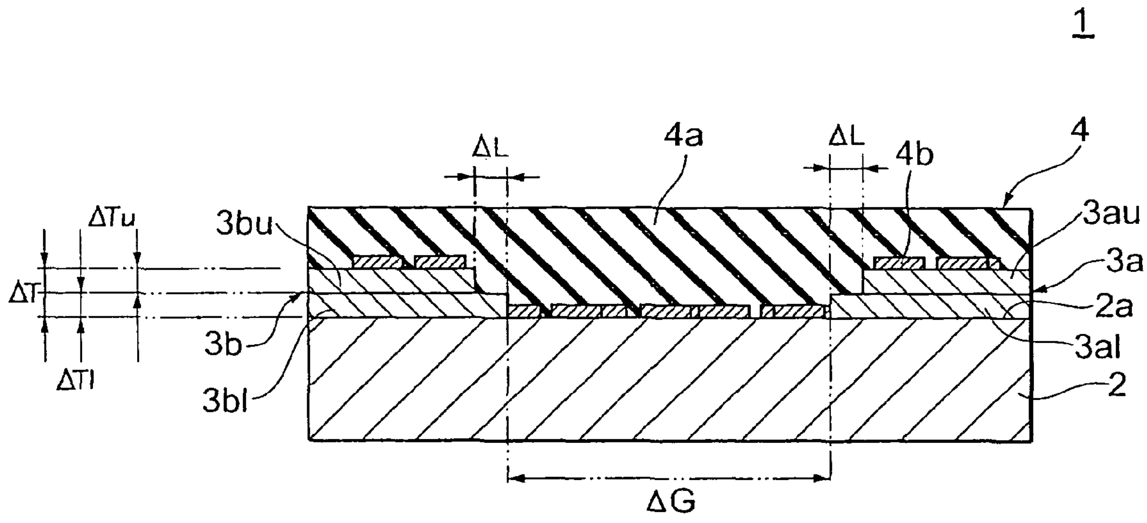
FIG. 1 is a schematic sectional view schematically showing an ESD protection device 1.

Embodiments of the present invention will be described below. Positional relationships such as vertical and lateral positions are based on those shown in the drawings unless otherwise specified. Moreover, dimensional scales for the drawings are not limited to those shown in the drawings. Furthermore, the embodiments described below are examples based on which the present invention will be described. The present invention is not limited to the embodiments.

First Embodiment

FIG. 1 is a schematic sectional view schematically showing a preferred embodiment of an ESD protection device according to the present invention. An ESD protection device 1 includes a base 2 having an insulating surface 2*a*, paired electrodes 3*a* and 3*b* disposed on the insulating surface 2*a*, a functional layer 4 disposed between the electrodes 3*a* and 3*b*, and a terminal electrode 5 (not shown in the drawings) electrically connected to the electrodes 3*a* and 3*b*. In the ESD protection device 1, the functional layer 4 is designed to function as an electrostatic protection material of a low voltage discharge type so that when overvoltage such as static electricity is applied to the ESD protection device 1, initial discharge occurs between the electrodes 3*a* and 3*b* via the functional layer 4.

The base 2 has the insulating surface 2*a*. Here, the base 2 having the insulating surface 2*a* is a concept including, besides a substrate composed of an insulating material, a substrate with an insulating film produced on a part or the entirety of the substrate. The dimensions and shape of the base 2 are not particularly limited provided that the base 2 can support at least the electrodes 3*a* and 3*b* and the functional layer 4.

A specific example of the base 2 may include a ceramic substrate and a single-crystal substrate composed of a low-dielectric-constant material with a dielectric constant of 50 or lower, preferably 20 or lower, such as NiZn ferrite, alumina, silica, magnesia, and aluminum nitride. Other preferred example may include any of well-known substrates with an insulating film formed on the surface thereof and composed of a low-dielectric-constant material with a dielectric constant of 50 or lower, preferably 20 or lower, such as NiZn ferrite, alumina, silica, magnesia, and aluminum nitride. An applicable method for forming an insulating film is not particularly limited to a specific one, and may be a well-known technique such as a vacuum deposition method, a reactive deposition method, a sputtering method, an ion plating method, or a gas phase method such as CVD or PVD. Furthermore, the thickness of the substrate and the insulating film can be set as appropriate.

The paired electrodes 3*a* and 3*b* are disposed on the insulating surface 2*a* of the base 2 away from each other. In the present embodiment, the paired electrodes 3*a* and 3*b* are oppositely arranged at a substantially central position as seen in a plan view, with a gap distance ΔG between the electrodes 3*a* and 3*b*.

The electrode 3*a* according to the present embodiment is a stack structure in which a lower layer 3*al* and an upper layer 3*au* are stacked. The electrode 3*b* according to the present embodiment is a stack structure in which a lower layer 3*bl* and an upper layer 3*bu* are stacked. The gap-side end surface of each of the upper layers 3*au* and 3*bu* extends beyond the gap-side end surface of each of the lower layers 3*al* and 3*bl* in the gap direction. This forms a multistage structure in which the gap between the electrodes 3*a* and 3*b* is narrower toward the base 2.

Specific examples of a material forming the electrodes 3*a* and 3*b* may include, for example, one species of metal selected from Ni, Cr, Al, Pd, Ti, Cu, Ag, Au, and Pt, or an alloy thereof. However, the present invention is not particularly limited to these materials. In the present embodiment, each of the electrodes 3*a* and 3*b* is formed to be rectangular as seen in a plan view. However, the shape of the electrode is not particularly limited but may be like comb teeth or a saw.

A method for forming the electrodes 3*a* and 3*b* is not particularly limited but may be an appropriately selected well-known one. Specifically, a method can be used which involves sequentially forming the lower layer 3*al* and 3*bl* and the upper layer 3*au* and 3*bu* by, for example, application, transfer, electrolytic plating, non-electrolytic plating, deposition, or sputtering to produce the electrodes 3*a* and 3*b*. In the electrodes 3*a* and 3*b*, the lower layers 3*al* and 3*bl* may be integrated with the upper layers 3*au* and 3*bu*. In this case, a method is applicable which involves using laser or ion beams, photolithography, or the like to pattern-form a metal layer or an alloy layer formed all over the surface of the base 2, into the electrodes 3*a* and 3*b* (and the gap).

The gap distance ΔG between the electrodes 3*a* and 3*b* is not particularly limited but can be appropriately set according to the purpose. In order to ensure low-voltage initial discharge and to inhibit the possible short-circuiting between the electrodes 3*a* and 3*b* with appropriate processability maintained during gap formation, the gap distance ΔG is preferably set to the ranges of 0.5 to 10 μm, more preferably the ranges of 0.5 to 8 μm. In the specification, the term "gap distance ΔG" means the shortest distance between the electrodes 3*a* and 3*b*.

The multistage structure of the electrodes 3*a* and 3*b* is not particularly limited provided that the gap between the electrodes 3*a* and 3*b* is narrower toward the base 2. In the aspect in which the gap between the electrodes 3*a* and 3*b* is narrower toward the base 2, the electrodes 3*a* and 3*b* can be easily formed. This improves productivity and reduces costs. For the electrodes 3*a* and 3*b*, the present embodiment adopts the two-stage structure in which the lower layers 3*al* and 3*bl* and the upper layers 3*au* and 3*bu* are formed. However, for example, a multistage structure with at least two stages (for example, three or four stages) or a tapered multistage structure may be used.

The thickness of each of the electrodes 3*a* and 3*b* is not particularly limited but may be appropriately set according to the purpose. However, the thickness is preferably set to the ranges of 0.1 to 1 μm. In order to prevent the formation of the functional layer 4 described below from being disturbed, the thickness ΔTl of each of the lower layers 3*al* and 3*bl* is preferably set equal to the gap distance ΔG between the electrodes 3*a* and 3*b* or smaller. Furthermore, in order to improve the efficiency of thermal conductance, the thickness ΔTu of each of the upper layers 3*au* and 3*bu* is preferably set to at least double the thickness ΔTl of each of the lower layers 3*al* and 3*bl*. In order to facilitate the discharge between the lower layers 3*al* and 3*bl* to inhibit possible discharge damage to the upper layers 3*au* and 3*bu* while improving the efficiency of heat diffusion by the upper layers 3*au* and 3*bu*, the extension dimension (the length of the step between the upper and lower layers; also referred to as a stair tread dimension) ΔL of each of the lower layers 3*al* and 3*bl* extending from the upper layers 3*au* and 3*bu*, respectively is preferably set to the ranges of 1 to 30 μm.

The functional layer 4 is disposed between the electrodes 3*a* and 3*b*. In the present embodiment, the functional layer 4 is stacked on the insulating surface 2*a* of the base 2 and on the electrodes 3*a* and 3*b*. The dimensional shape and the position disposed of the functional layer 4 are not particularly limited as long as they are designed such that initial discharge occurs between the electrodes 3*a* and 3*b* via the functional layer 4 itself when overvoltage is applied to the device.

Figure 2:
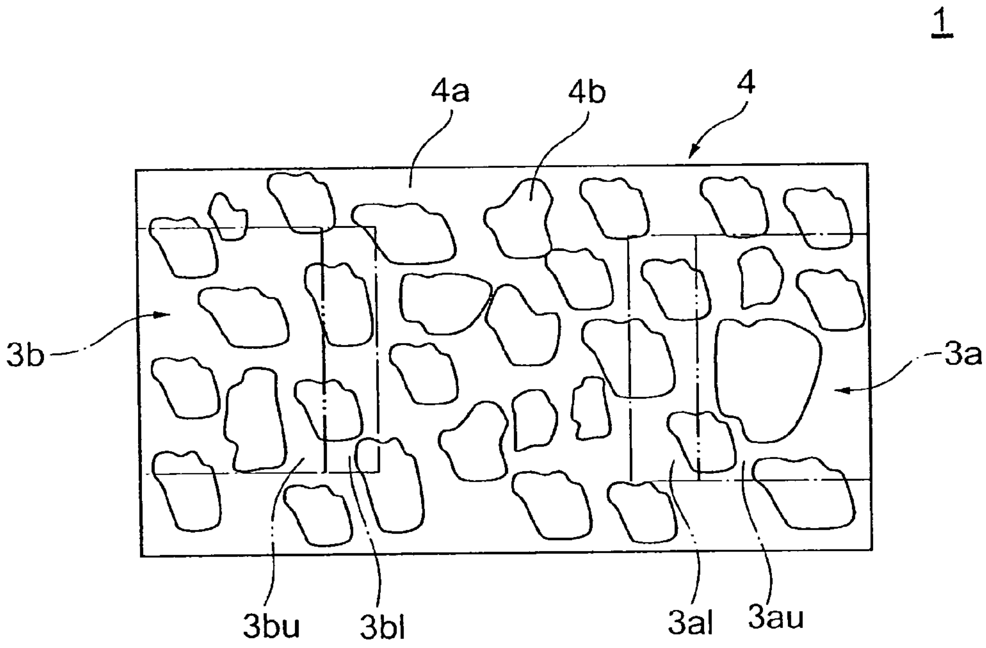
FIG. 2 is a schematic plan view of a functional layer 4 in the ESD protection device 1.

FIG. 2 is a schematic plan view of the functional layer 4.

The functional layer 4 is composed of a composite of a sea-island structure including an aggregate of island-like conductive inorganic materials 4*b* discontinuously dispersed in a matrix of an insulating inorganic material 4*a*. In the present embodiment, the functional layer 4 is formed by sequential sputtering. More specifically, a layer of the conductive inorganic material 4*b* is partially (incompletely) formed on the insulating surface 2*a* of the base 2 and/or the electrodes 3*a* and 3*b* by sputtering. Subsequently, the insulating inorganic material 4*a* is sputtered to form a composite of a stack structure including the layer of the conductive inorganic materials 4*b* dispersed like islands and the insulating inorganic material 4*a* covering the conductive inorganic material 4*b*.

Specific examples of the insulating inorganic material 4*a* forming the matrix include metal oxide and metal nitride. However, the present invention is not limited to these examples. In view of the insulating property and costs, preferable materials include $Al_2O_3$, $TiO_2$, $SiO_2$, ZnO, $In_2O_3$, NiO, CoO, $SnO_2$, $V_2O_5$, CuO, MgO, $ZrO_2$, MN, BN, and SiC. One of these materials may be exclusively used or two or more of these materials may be used together. Among the materials, in view of a high insulating property applied to the insulating matrix, $Al_2O_3$, $SiO_2$, or the like is preferably used. On the other hand, in view of semi-conductivity applied to the insulating matrix, $TiO_2$ or ZnO is preferably used. By applying the semi-conductivity to the insulating matrix results in an ESD protection device allowing the discharge to be started at a lower voltage. A method of applying the semi-conductivity to the insulating matrix is not particularly limited. For example, $TiO_2$ or ZnO may be used exclusively or together with any other insulating inorganic material 4*a*. In particular, during sputtering in an argon atmosphere, oxygen in $TiO_2$ is likely to be insufficient, and electric conductivity tends to increase. Thus, $TiO_2$ is particularly preferably used in order to apply the semi-conductivity to the insulating matrix.

Specific examples of the conductive inorganic material 4*b* include metal, alloy, metal oxide, metal nitride, metal carbide, and metal boride. However, the present invention is not limited to these examples. In view of the conductivity, preferable materials include C, Ni, Cu, Au, Ti, Cr, Ag, Pd, and Pt or an alloy thereof.

Preferred combinations of the insulating inorganic material 4*a* and the conductive inorganic material 4*b* include, but not particularly limited to, a combination of Cu and $SiO_2$ and a combination of Au and $SiO_2$. An ESD protection device composed of these materials is excellent in electrical characteristics but also allows the accurate and easy formation of a composite of a sea-island structure including an aggregate of discontinuously dispersed island-like conductive inorganic materials 4*b*. This very advantageously facilitates processing and reduces costs.

The total thickness of the functional layer 4 is not particularly limited but can be appropriately set. In order to allow a further reduction in film thickness to further reduce the size of an electronic apparatus using the ESD protection device 1 while improving the performance of the electronic apparatus, the total thickness is preferably set to the ranges of 10 nm to 10 μm, more preferably the ranges of 15 nm to 1 μm, most preferably the ranges of 15 to 500 nm. Furthermore, a very thin composite made of an inorganic material and having a thickness of the ranges of 10 nm to 1 μm can be formed by application of the well-known thin-film formation method such as the sputtering method or the deposition method. This improves the productivity of the ESD protection device 1, while reducing the costs thereof. When the layer of the discontinuously dispersed island-like conductive inorganic materials 4*b* and the layer of matrix of the insulating inorganic material 4*a* are formed as in the present embodiment, the thickness of the layer of the conductive inorganic material 4*b* is preferably the ranges of 1 to 10 nm. The thickness of the layer of the insulating inorganic materials 4*a* is preferably the ranges of 10 nm to 10 μm, more preferably the ranges of 10 nm to 1 μm, most preferably the ranges of 10 to 500 nm.

A method for forming the functional layer 4 is not limited to the above-described sputtering method. The functional layer 4 can be formed by using the well-known thin-film formation method to apply the above-described insulating inorganic material 4*a* and conductive inorganic material 4*b* onto the insulating surface 2*a* of the base 2 and/or the electrodes 3*a* and 3*b*. That is, the ESD protection device 1 is very advantageous in that the functional layer 4 is composed of, instead of the above-described organic-inorganic composite film formed by the conventional printing method, the composite of the insulating inorganic material 4*a* and the conductive inorganic material 4*b*, which can be formed into layers by the sputtering method, the deposition method, or the like. The ESD protection device 1 according to the present embodiment may be configured such that application of a voltage between the electrodes 3*a* and 3*b* causes part of the electrodes 3*a* and 3*b* to disperse into the functional layer 4, resulting in the containment, in the functional layer 4, of the material forming the electrodes 3*a* and 3*b*.

In the ESD protection device 1 according to the present embodiment, the functional layer 4 containing the island-like conductive inorganic material 4*b* discontinuously dispersed in the matrix of the insulating inorganic material 4*a* functions as an electrostatic protection materials of a low-voltage discharge type. Specifically, when an electrostatic voltage is applied to between the paired electrodes 3*a* and 3*b*, discharge occurs at a point at which high energy concentrates and which is located in any path formed by the island-like conductive inorganic material 4*b* discontinuously dispersed in the matrix of the insulating inorganic material 4*a*; the path is located between the electrodes 3*a* and 3*b*. Electrostatic discharge energy is thus absorbed. High-voltage discharge may cause the electrodes or functional layer to be partially damaged after discharge. However, the discontinuously dispersed island-like conductive inorganic materials 4*b* form a large number of current paths, enabling static electricity to be absorbed a number of times.

In particular, the ESD protection device 1 according to the present embodiment has the multistage structure in which the electrode 3*a* has the stack structure including the wide lower layer 3*al* and the narrow upper layer 3*au* and in which the electrodes 3*b* has the stack structure including the wide lower layer 3*bl* and the narrow upper layer 3*bu*. Thus, the discharge between the lower layers 3*al* and 3*bl* is facilitated, and heat resulting from the discharge diffuses easily. This improves durability against repeated use.

Furthermore, the present embodiment adopts the composite composed at least of the insulating inorganic material 4*a* and the conductive inorganic material 4*b*, as the functional layer 4 functioning as an electrostatic protection material of a low-voltage discharge type. Thus, compared to the conventional ESD protection device with the organic-inorganic composite film, the ESD protection device 1 offers a small electrostatic capacitance and a low discharge starting voltage and is very excellent in heat resistance and weather resistance. Moreover, since the functional layer 4 is formed by the sputtering method, the ESD protection device 1 serves to improve productivity while reducing costs.

The ESD protection device 1 according to the first embodiment adopts, as the functional layer 4, the composite in which the conductive inorganic materials 4*b* are discontinuously dispersed in the matrix of the insulating inorganic material 4*a*. However, the functional layer 4 may be a composite in which metal particles, for example, Ag, Cu, Ni, Al, or Fe or particles of a conductive metal compound are dispersed in high insulating resin such as silicone resin and epoxy resin.

Second Embodiment

Figure 3:
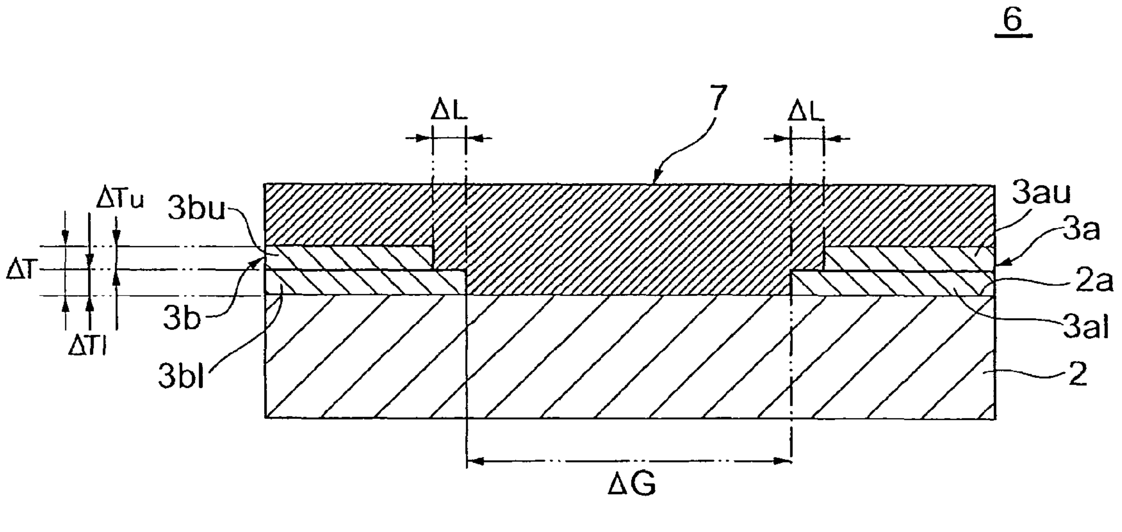
FIG. 3 is a schematic sectional view schematically showing an ESD protection device 6.

FIG. 3 is a schematic sectional view schematically showing another preferred embodiment of the ESD protection device according to the present invention. This ESD protection device 6 has the same configuration as that of the above-described ESD protection device 1 according to the first embodiment except that the ESD protection device 6 has a functional layer 7 instead of the functional layer 4.

The functional layer 7 is a composite in which conductive inorganic materials 4*b* (not shown in the drawings) are dispersed in a matrix of an insulating inorganic material 4*a* (not shown in the drawings). In the present embodiment, the functional layer 7 is formed by sputtering a target containing the insulating inorganic material 4*a* (or a target containing the insulating inorganic material 4*a* and the conductive inorganic materials 4*b*) onto an insulating surface 2*a* of a base 2 and/or electrodes 3*a* and 3*b* and then applying a voltage to between the electrodes 3*a* and 3*b* to allow part of the electrodes 3*a* and 3*b* to disperse randomly into the insulating inorganic material 4*a*. Thus, the functional layer 7 according to the present embodiment contains at least the conductive inorganic materials 4*b*, that is, the material forming the electrodes 3*a* and 3*b*.

The total thickness of the functional layer 7 is not particularly limited but can be appropriately set. However, in order to allow a further reduction in film thickness, the total thickness is preferably set to the ranges of 10 nm to 10 μm, more preferably the ranges of 10 nm to 1 μm, and most preferably the ranges of 10 to 500 nm.

In the ESD protection device 6 according to the present embodiment, the composite in which the granular conductive inorganic materials 4*b* are discontinuously dispersed in the matrix of the insulating inorganic material 4*a* is adopted as the functional layer 7 functioning as an electrostatic protection material of a low-voltage discharge type. This configuration exerts effects similar to those of the above-described first embodiment.

Third Embodiment

Figure 4:
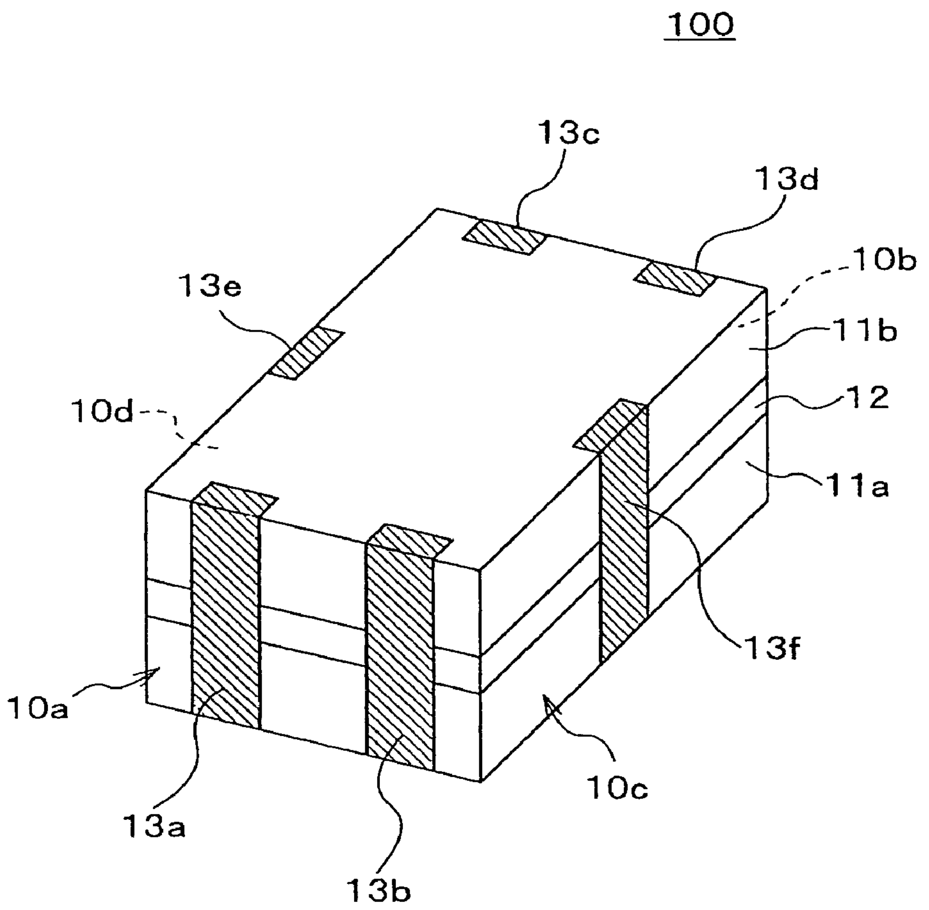
FIG. 4 is a schematic perspective view showing the external configuration of a composite electronic component 100.

FIG. 4 is a perspective view schematically showing the external configuration of a preferred embodiment of a composite electronic component according to the present invention.

As shown in FIG. 4, a composite electronic component 100 according to the present embodiment is a thin-film common mode filter having an electrostatic protection function. The composite electronic component 100 includes a first magnetic base 11*a* and a second magnetic base 11*b*, and a composite functional layer 12 sandwiched between the first magnetic base 11*a* and the second magnetic base 11*b*. Furthermore, a first terminal electrode 13*a* to a sixth terminal electrode 13*f* are formed on the outer peripheral surface of a stack composed of the first magnetic base 11*a*, the composite functional layer 12, and the second magnetic base 11*b*. The first and second terminal electrodes 13*a* and 13*b* are formed on a first side surface 10*a*. The third and fourth terminal electrodes 13*c* and 13*d* are formed on a second side surface 10*b* located opposite the first side surface 10*a*. The fifth terminal electrode 13*e* is formed on a third side surface 10*c* located orthogonally to the first and second side surfaces 10*a* and 10*b*. The sixth terminal electrode 13*f* is formed on a fourth side surface 10*d* located opposite the third side surface.

The first and second magnetic base 11*a* and 11*b* physically protect the composite functional layer 12 and serves as a closed magnetic circuit for the common mode filter. Sintered ferrite, composite ferrite (a resin containing powdery ferrite), or the like can be used as a material for the first and second magnetic bases 11*a* and 11*b*.

Figure 5:
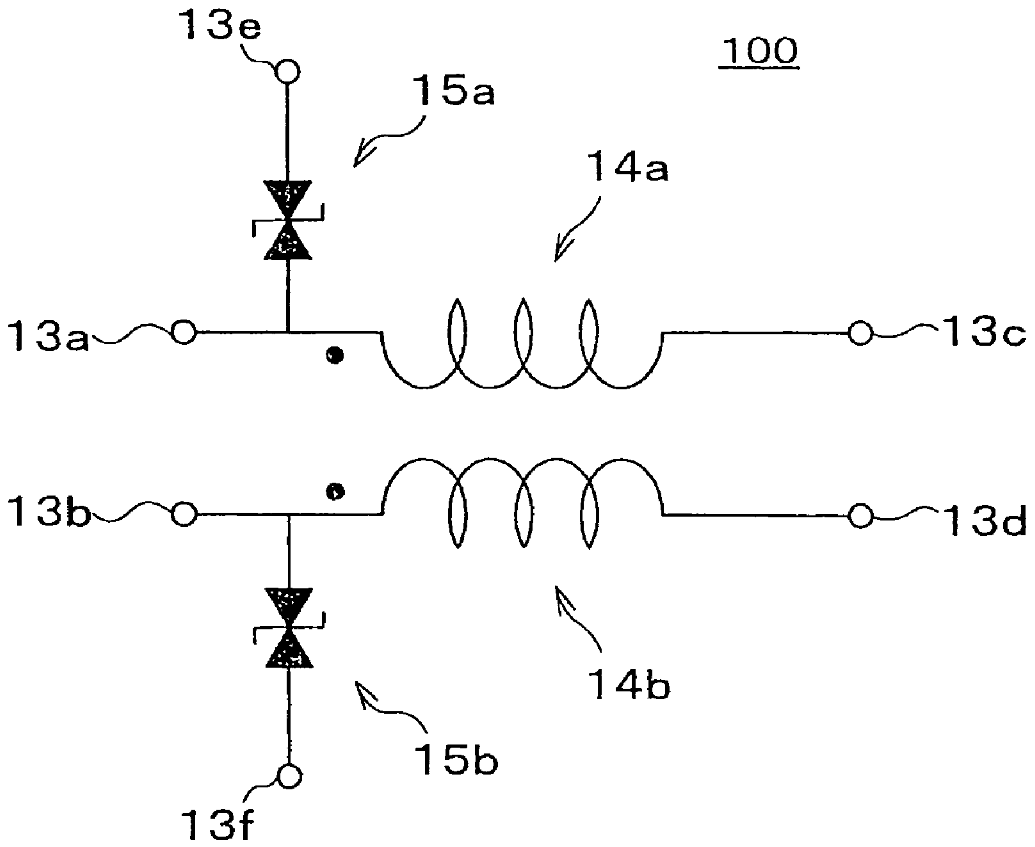
FIG. 5 is a circuit diagram showing the configuration of the composite electronic component 100.

FIG. 5 is a circuit diagram showing the configuration of the composite electronic component 100.

As shown in FIG. 5, the composite electronic component 100 includes inductor devices 14*a* and 14*b* functioning as common mode choke coils, and ESD protection devices 15*a* and 15*b*. One end of the inductor device 14*a* is connected to the first terminal electrode 13*a*. One end of the inductor device 14*b* is connected to the second terminal electrode 13*b*. The other end of the inductor device 14*a* is connected to the third terminal electrode 13*c*. The other end of the inductor device 14*b* is connected to the fourth terminal electrode 13*d*. Furthermore, one end of an ESD protection device 15*a* is connected to the first terminal electrode 13*a*. One end of an ESD protection device 15*b* is connected to the second terminal electrode 13*b*. The other end of the ESD protection device 15*a* is connected to the fifth terminal electrode 13*e*. The other end of the ESD protection device 15*b* is connected to the sixth terminal electrode 13*f*. When the composite electronic component 100 is mounted on a pair of signal lines, the first and second terminal electrodes 13*a* and 13*b* are connected to the input sides of the respective signal lines. The third and fourth terminal electrodes 13*c* and 13*d* are connected to the output sides of the respective signal lines. Furthermore, the fifth and sixth terminal electrodes 13*e* and 13*f* are connected to the respective ground lines.

Figure 6:
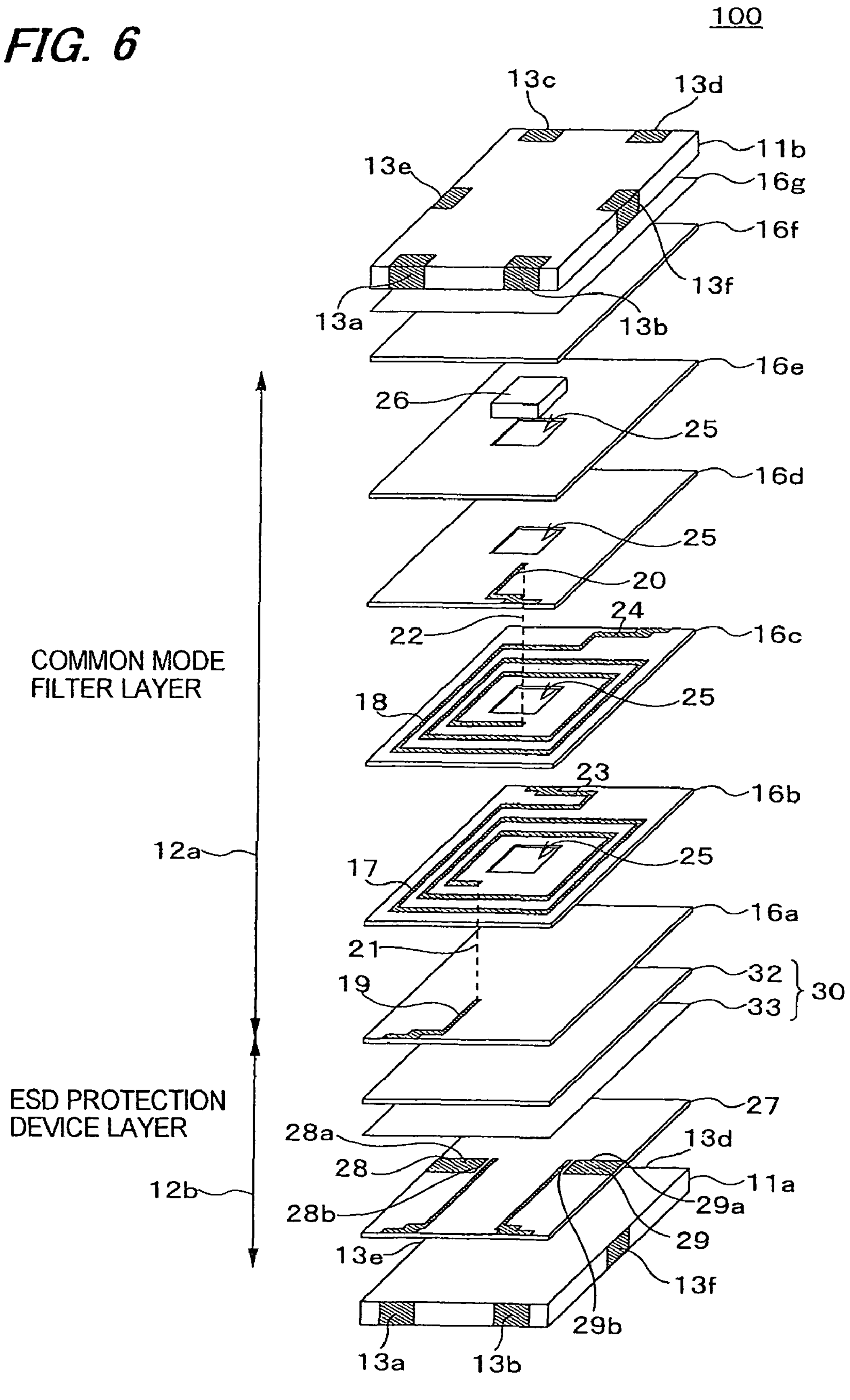
FIG. 6 is a schematic exploded perspective view showing an example of the layer structure of the composite electronic component 100.

FIG. 6 is an exploded perspective view showing an example of the layer structure of the composite electronic component 100.

As shown in FIG. 6, the composite electronic component 100 includes a first magnetic base 11*a* and a second magnetic base 11*b*, and a composite functional layer 12 sandwiched between the first and second magnetic bases 11*a* and 11*b*. The composite functional layer 12 is composed of a common mode filter layer 12*a* and an ESD protection device layer 12*b*.

The common mode filter layer 12*a* includes insulating layers 16*a* to 16*e*, a magnetic layer 16*f*, an adhesive layer 16*g*, a first spiral conductor 17 formed on an insulating layer 16*b*, a second spiral conductor 18 formed on an insulating layer 16*c*, a first extraction conductor 19 formed on the insulating layer 16*a*, and a second extraction conductor 20 formed on the insulating layer 16*d*.

The insulating layers 16*a* to 16*e* insulate conductor patterns from one another or each of the conductor patterns from the magnetic layer 16*f*. The insulating layers 16*a* to 16*e* also serve to maintain the flatness of the underlying surface on which each conductor pattern is formed. A preferable material for the insulating layers 16*a* to 16*e* is a resin offering excellent electric and magnetic insulating properties as well as appropriate processability. That is, the preferable material is a polyimide resin or an epoxy resin. As the conductive patterns, Cu, Al, or the like, which is excellent in conductivity and processability, is preferably used. The conductor patterns can be formed by an etching method or an additive method (plating) using photolithography.

An opening 25 penetrating the insulating layers 16*a* to 16*e* is formed in a central area of each of the insulating layers 16*a* to 16*e* and inside the first and second spiral conductors 17 and 18. The interior of the opening 25 is filled with a magnetic substance 26 forming a closed magnetic circuit between the first magnetic base 11*a* and the second magnetic base 11*b*. Composite ferrite or the like is preferably used as the magnetic substance 26.

Moreover, the magnetic layer 16*f* is formed on the surface of the insulating layer 16*e*. The magnetic substance 26 in the opening 25 is formed by hardening pasted composite ferrite (a resin containing magnetic powder). However, during hardening, the resin contracts to create recesses and protrusions in the opening portion. To allow the number of recesses and protrusions to be reduced as much as possible, the paste is preferably applied not only to the interior of the opening 25 but also to the entire surface of the insulating layer 16*e*. The magnetic layer 16*f* is formed in order to ensure such flatness of the magnetic layer 16*f*.

The adhesive layer 16*g* is required to stick the magnetic base 11*b* onto the magnetic layer 16*f*. The adhesive layer 16*g* also serves to reduce the recesses and protrusions on the surfaces of the magnetic base 11*b* and the magnetic layer 16*f* to allow tighter contact. A material for the adhesive layer 16*g* is not particularly limited but may be an epoxy resin, a polyimide resin, a polyamide resin, or the like.

The first spiral conductor 17 corresponds to the inductor device 14*a* shown in FIG. 5. The inner peripheral end of the first spiral conductor 17 is connected to the first terminal electrode 13*a* via a first contact hole conductor 21 penetrating the insulating layer 16*b* and the first extraction conductor 19. Furthermore, the outer peripheral end of the first spiral conductor 17 is connected to the third terminal electrode 13*c* via the third extraction conductor 23.

The second spiral conductor 18 corresponds to the inductor device 14*b* shown in FIG. 5. The inner peripheral end of the second spiral conductor 18 is connected to the second terminal electrode 13*b* via a second contact hole conductor 22 penetrating the insulating layer 16*d* and the second extraction conductor 20. Furthermore, the outer peripheral end of the second spiral conductor 18 is connected to the fourth terminal electrode 13*d* via the fourth extraction conductor 24.

Both the first and second spiral conductors 17 and 18 have the same planar shape and are provided at the same position as seen in a plan view. The first and second spiral conductors 17 and 18 overlap perfectly and are strongly magnetically coupled together. In the above-described configuration, the conductor patterns in the common mode filter layer 12*a* forms a common mode filter.

The ESD protection device layer 12*b* includes an underlying insulating layer 27, a first gap electrode 28 and a second gap electrode 29 formed on the surface of the underlying insulating layer 27, and an electrostatic absorption layer 30 covering the first and second gap electrodes 28 and 29. A layer structure near the first gap electrode 28 functions as the first ESD protection device 15*a* shown in FIG. 5. A layer structure near the second gap electrode 29 functions as the second ESD protection device 15*b* shown in FIG. 5. One end of the first gap electrode 28 is connected to the first terminal electrode 13*a*. The other end of the first gap electrode 28 is connected to the fifth terminal electrode 13*e*. Furthermore, one end of the second gap electrode 29 is connected to the second terminal electrode 13*b*. The other end of the second gap electrode 29 is connected to the sixth terminal electrode 13*f*.

Figure 7:
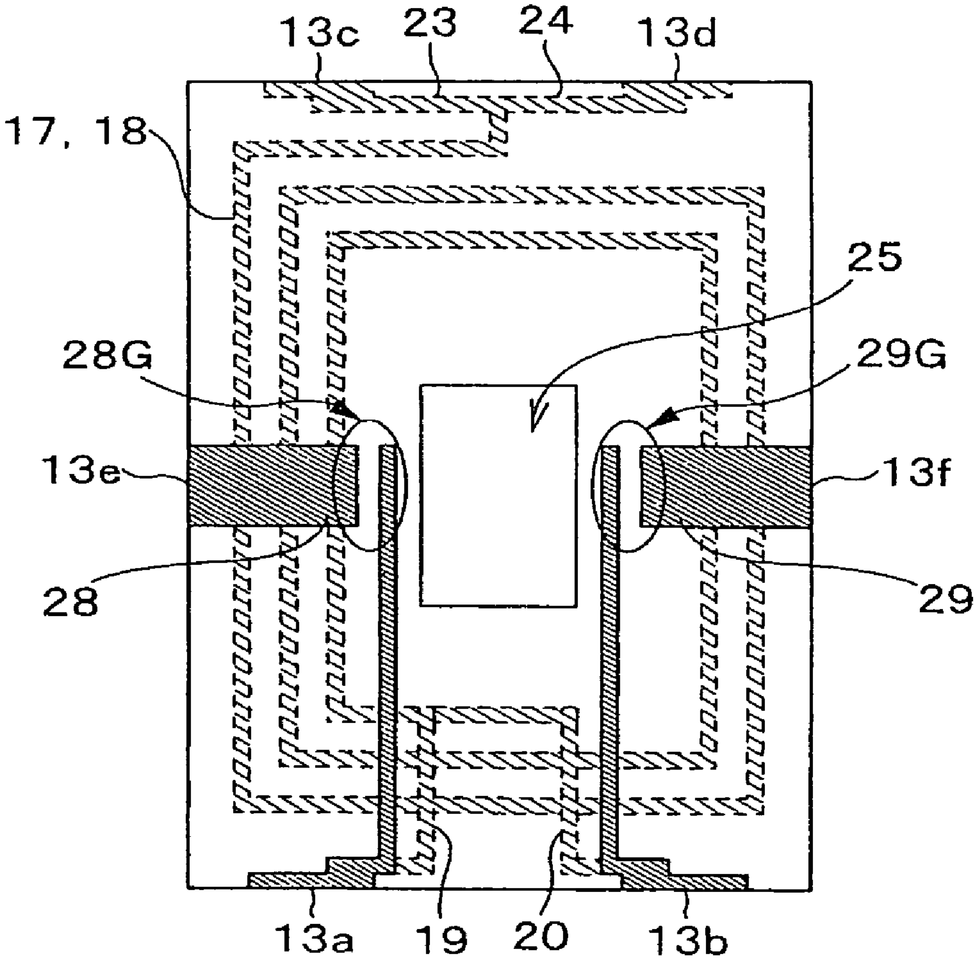
FIG. 7 is a schematic plan view showing the positional relationship between gap electrodes 28 and 29 and other conductive patterns.

FIG. 7 is a schematic plan view showing the positional relationship between the gap electrodes 28 and 29 and the other conductor patterns.

As shown in FIG. 7, gaps 28G and 29G of the gap electrodes 28 and 29 are set at positions where the gap 28G and 29G overlap none of the first and second spiral conductors 17 and 18 and first and second extraction conductors 19 and 20, included in the common mode filter. Although not particularly limited, in the present embodiment, the gaps 28G and 29G are set in free spaces inside the spiral conductors 17 and 18 and between the opening 25 and the spiral conductors 17 and 18. Although described below in detail, the ESD protection device may be partly damaged or deformed by absorption of static electricity. Thus if any conductor pattern is located so as to overlap the ESD protection device, the conductive pattern may also be damaged. However, since the gaps 28G and 29G of the ESD protection devices are set at the positions where the gaps 28G and 29G do not overlap any conductor pattern, when any ESD protection device is electrostatically destroyed, the overlying and underlying layers can be prevented from being affected. As a result, a reliable composite electronic component can be provided.

Figure 8:
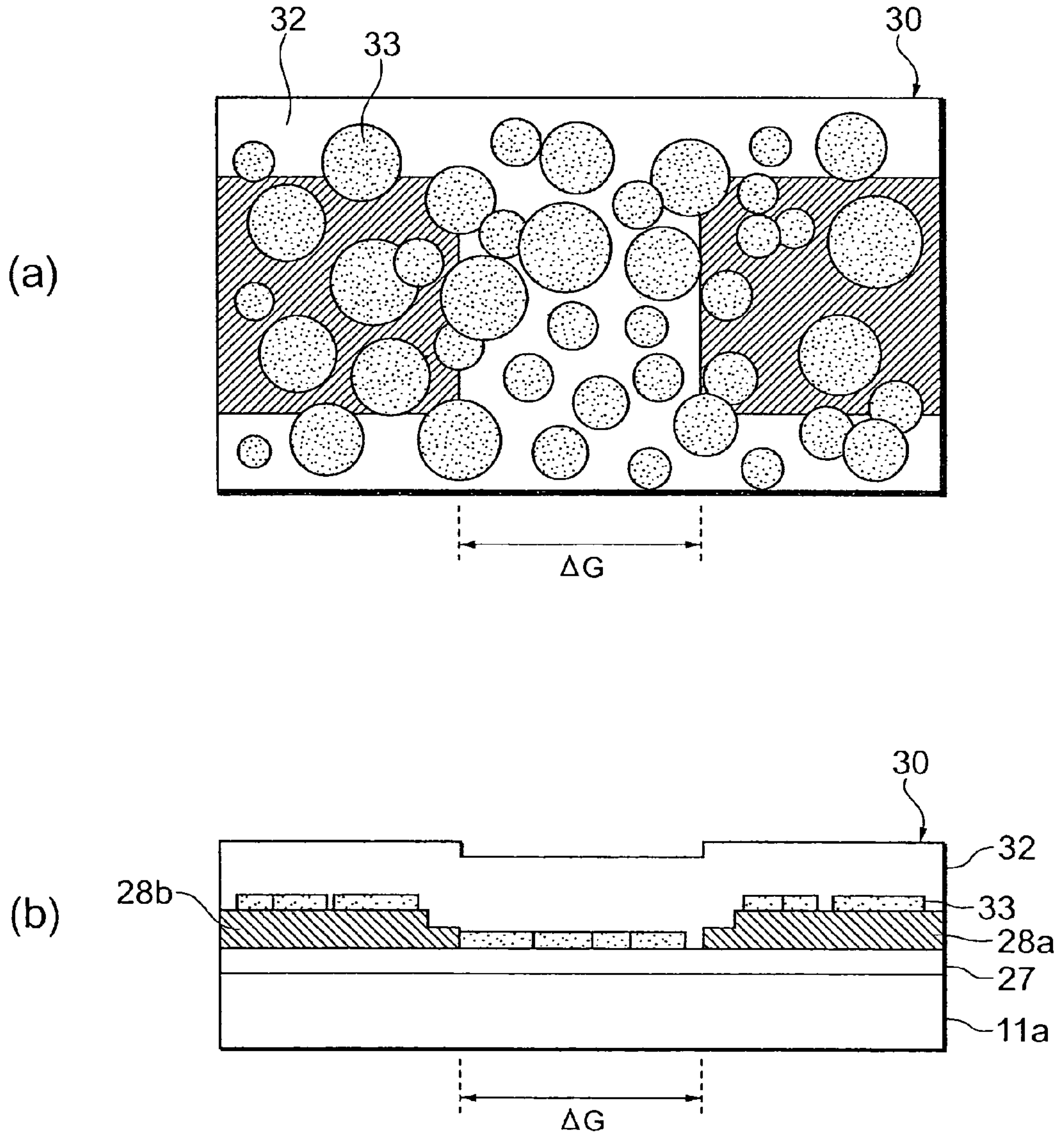
FIG. 8 is a view showing an example of a layer structure near the first gap electrode 28 in an ESD protection device layer 12*b*, wherein FIG. 8(*a*) is a schematic plan view, and FIG. 8(*b*) is a schematic sectional view.

FIGS. 8(*a*) and 8(*b*) are views showing an example of the layer structure near the first gap electrode 28 in the ESD protection device layer 12*b*. FIG. 8(*a*) is a schematic plan view, and FIG. 8(*b*) is a schematic sectional view. The configuration of the second gap electrode 29 is the same as that of the first gap electrode 28. Thus, duplicate descriptions are omitted.

The ESD protection device layer 12*b* includes an underlying insulating layer 27 formed on the surface of the magnetic base 11*a*, paired electrodes 28*a* and 28*b* included in the first gap electrode 28, and an electrostatic absorption layer 30 disposed between the electrodes 28*a* and 28*b*.

The underlying insulating layer 27 functions as the insulating surface 2*a* according to the above-described first embodiment. The underlying insulating layer 27 is composed of an insulating material. In the present embodiment, the underlying insulating layer 27 covers the entire surface of the magnetic base 11*a* because this arrangement is easy to manufacture. However, the underlying insulating layer 27 has only to lie under at least the electrodes 28*a* and 28*b* and the electrostatic absorption layer 30 and need not necessarily cover the entire surface of the magnetic base 11*a*. Preferable specific examples of the underlying insulating layer 27 include not only a film formed of a low-dielectric-constant material with a dielectric constant of 50 or lower, preferably 20 or lower, such as NiZn ferrite, alumina, silica, magnesia, or aluminum nitride, but also an insulating film composed of any of these low-dielectric-constant material and formed on any of various well-known substrates. A method for producing the underlying insulating layer 27 is not particularly limited but may be a well-known technique such as the vacuum deposition method, reactive deposition method, sputtering method, ion plating method, or gas phase method such as CVD or PVD. Furthermore, the film thickness of the underlying insulating layer 27 can be appropriately set.

The electrodes 28*a* and 28*b* correspond to the electrodes 3*a* and 3*b* in the above-described first embodiment. Duplicate descriptions are thus omitted.

The electrostatic absorption layer 30 is composed of a composite of a sea-island structure including an aggregate of conductive inorganic materials 33 discontinuously dispersed in a matrix of an insulating inorganic material 32. The electrostatic absorption layer 30 corresponds to the functional layer 4 in the above-described first embodiment. Furthermore, the insulating inorganic material 32 and the conductive inorganic materials 33 correspond to the insulating inorganic material 4*a* and conductive inorganic materials 4*b* in the above-described first embodiment. Duplicate descriptions of these materials are omitted.

In the ESD protection device layer 12*b*, the electrostatic absorption layer 30 functions as an electrostatic protection material of a low voltage discharge type. The electrostatic absorption layer 30 is designed such that when overvoltage such as static electricity is applied to the component, early discharge occurs between the electrodes 28*a* and 28*b* via the electrostatic absorption layer 30. Furthermore, the insulating inorganic material 32 according to the present embodiment functions as a protection layer protecting the paired electrodes 28*a* and 28*b* and the conductive inorganic materials 33 from any upper layer (for example, the insulating layer 16*a*).

As described above, the composite electronic component 100 according to the present embodiment contains an ESD protection device of a low voltage type offering a reduced electrostatic capacitance, a reduced discharge starting voltage, and an improved durability against repeated use. Thus, the composite electronic component can function as a common mode filter having an advanced electrostatic protection function.

Furthermore, according to the present embodiment, the insulating inorganic material 32 and the conductive inorganic materials 33 are used as materials for the ESD protection device layer 12*b*, and none of the various materials forming the ESD protection device layer 12*b* contain resin. Thus, the ESD protection device layer 12*b* can be formed on the magnetic base 11*a*. Moreover, the common mode filter layer 12*a* can be formed on the ESD protection device layer 12*b*. A thermal treatment process at 350° C. or higher is required to form the common mode filter layer 12*a* using what is called a thin film formation method. A thermal treatment process at 800° C. is required to form the common mode filter layer 12*a* using what is called a stacking method of sequentially stacking ceramic sheets with respective conductive patterns formed thereon. However, when the insulating inorganic material 32 and the conductive inorganic material 33 are used for the ESD protection device layer, an ESD protection device can be reliably formed which can function normally while withstanding the thermal treatment process. Moreover, the ESD protection device can be formed on the sufficiently flat surface of the magnetic base. Thus, the fine gap of the gap electrode can be stably formed.

Additionally, according to the present embodiment, the gap electrodes are formed at the positions where the gap electrodes do not two-dimensionally overlap the first and second spiral conductors and the like forming the common mode filter to avoid the conductor patterns thereof. This prevents possible vertical impacts when the ESD protection device is partially electrostatically damaged. Thus, a more reliable composite electronic component can be provided.

Moreover, according to the present embodiment, as shown in FIG. 5, the composite electronic component 100 is mounted on the paired signal lines, and the ESD protection devices 15*a* and 15*b* are provided closer to the input sides of the signal lines than the common mode filter. This enables an increase in the efficiency with which the ESD protection device absorbs overvoltage. The electrostatic overvoltage is normally an abnormal voltage with impedance unmatched, and is thus reflected once at the input end of the common mode filter. The reflection signal is superimposed on the original signal waveform. The resulting signal with a raised voltage is absorbed by the ESD protection device at a time. That is, the common mode filter provided after the ESD protection device enlarges the waveform compared to the original one. The ESD protection device thus allows the overvoltage to be absorbed more easily than at a lower voltage level. Thus, the signal absorbed once is input to the common mode filter, which can then remove even faint noise.

EXAMPLES

The present invention will be described below in detail with reference to examples. However, the present invention is not limited to the examples.

Example 1

Figure 9:
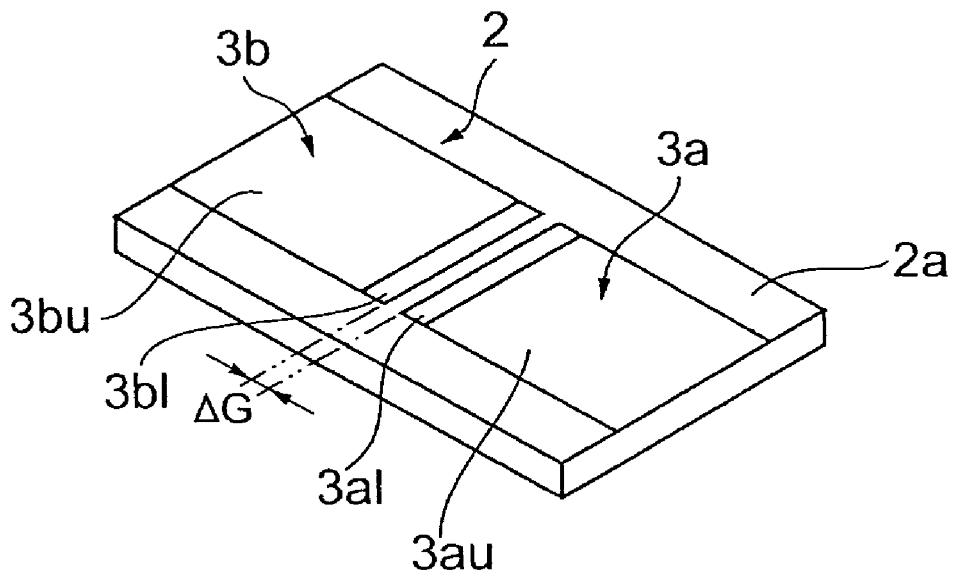
FIG. 9 is a schematic perspective view showing a process of manufacturing the ESD protection device 1.

As shown in FIG. 9, first, on one insulating surface 2*a* of an insulating base 2 (an NiZn ferrite substrate; a dielectric constant: 13; manufactured by TDK Corporation; size: 1.6 mm×0.8 mm; thickness: 0.5 mm), a thin chromium film of length 1.6 mm, width 0.5 mm, and thickness 10 nm was pattern-formed as an underlying layer (tight contact layer) by the sputtering method using a mask. Then, a thin Cu film of thickness 0.1 μm and a thin Cu film of thickness 0.3 μm were sequentially formed on the thin chromium film by the sputtering method using a mask; the former thin Cu film corresponded to lower layers 3*al* and 3*bl*, and the latter thin Cu film corresponded to upper layers 3*au* and 3*bu*. Thereafter, gaps were formed by milling using ion beams. Thus, paired band-like electrodes 3*a* and 3*b* arranged away from and opposite each other and the gaps were pattern-formed. Each of the electrodes 3*a* and 3*b* was sized so as to have a length of about 0.8 mm and a width of about 0.5 mm. Each of the lower layers 3*al* and 3*bl* had an extension dimension ΔL of 10 μm. The gap distance ΔG between the electrodes 3*a* and 3*b* was 1 μm.

Figure 10:
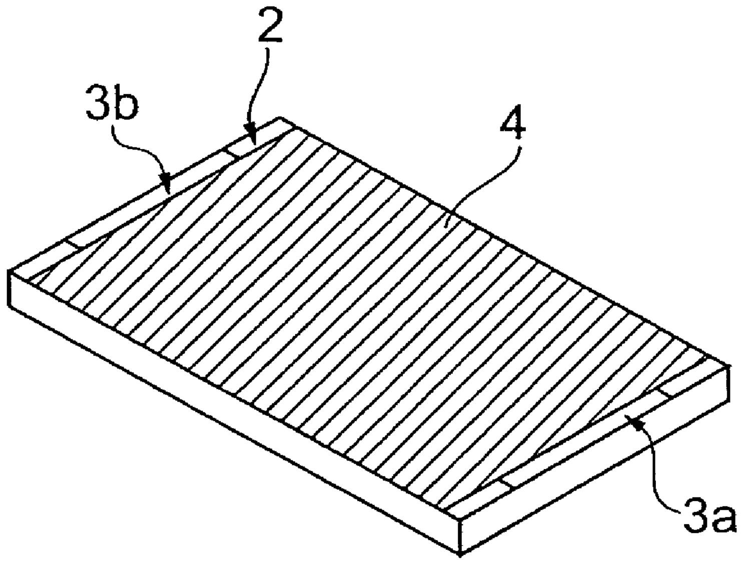
FIG. 10 is a schematic perspective view showing the process of manufacturing the ESD protection device 1.

Then, as shown in FIG. 10, a functional layer 4 was formed on the insulating surface 2*a* of the base 2 and on the electrodes 3*a* and 3*b* according to the following procedure.

First, Au was deposited on parts of the surface of the base 2 with the electrodes 3*a* and 3*b* formed thereon by sputtering to form a layer of conductive inorganic materials 4*b* in which island-like thin Au films of thickness 3 nm were discontinuously dispersed. The sputtering was carried out using a multi-target sputter apparatus (trade name: ES350SU; manufactured by EIKO Engineering Co., Ltd.) under conditions including an argon pressure of 10 mTorr, an input power of 20 W, and a sputter time of 40 seconds.

Then, silicon dioxide was deposited, by the sputtering method, almost all over the surface of the base 2 with the electrodes 3*a* and 3*b* and the conductive inorganic materials 4*b* formed thereon so as to entirely cover the layer of the electrodes 3*a* and 3*b* and the conductive inorganic materials 4*b* in the thickness direction. Thus, a layer of an insulating inorganic material 4*a* of thickness 600 nm was formed. The sputtering was carried out using a multi-target sputter apparatus (trade name: ESU350; manufactured by EIKO Engineering Co., Ltd.) under conditions including an argon pressure of 10 mTorr, an input power of 400 W, and a sputter time of 40 minutes.

Figure 11:
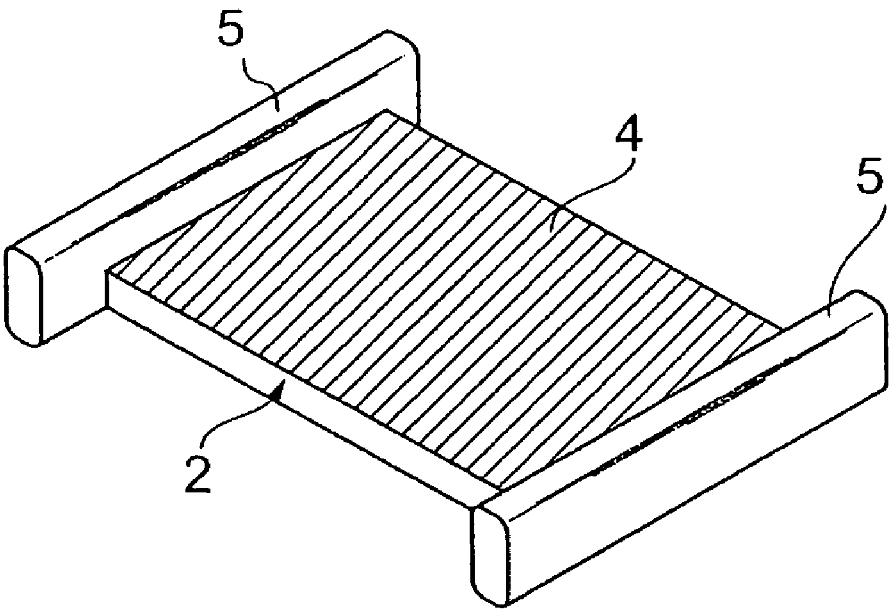
FIG. 11 is a schematic perspective view showing the process of manufacturing the ESD protection device 1.

The above-described operations resulted in the formation of the functional layer 4 having the island-like conductive inorganic materials 4*b* discontinuously dispersed in the matrix of the insulating inorganic material 4*a*. Thereafter, as shown in FIG. 11, terminal electrodes 5 composed mainly of Cu were formed so as to connect to the outer peripheral ends of the electrodes 3_a_ and 3_b_. As a result, an ESD protection device 1 in Example 1 was obtained.

Example 2

An ESD protection device 1 in Example 2 was obtained by performing operations similar to those in Example 1 except that the gap distance ΔG between the electrodes 3_a_ and 3_b_ was changed to 3 μm.

Comparative Example 1

An ESD protection device 1 in Comparative Example 1 was obtained by performing operations similar to those in Example 1 except that paired single-layer electrodes (length: 0.8 mm; width: 0.5 mm) composed of a thin Cu film of thickness 0.1 μm and not having a multistage structure were formed instead of the electrodes 3_a_ and 3_b_.

<Electrostatic Discharge Tests>

Figure 12:
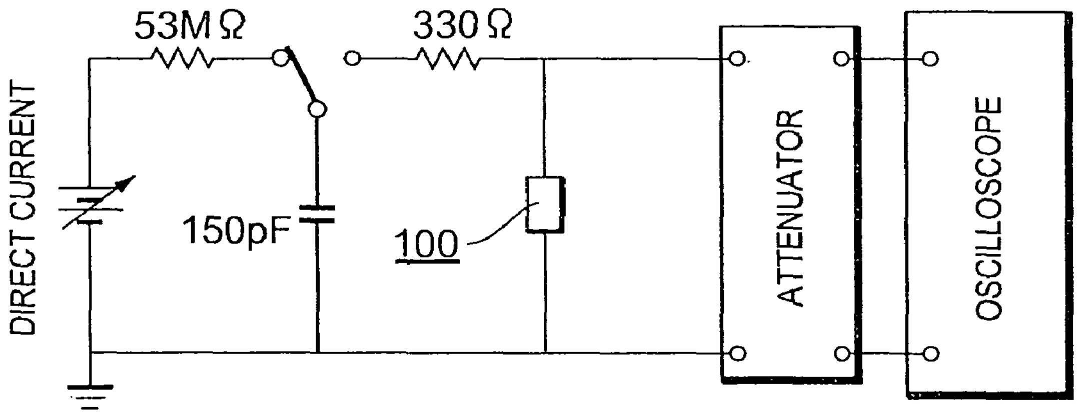
FIG. 12 is a circuit diagram for electrostatic discharge tests.

Then, an electrostatic test circuit shown in FIG. 12 was used to carry out electrostatic discharge tests on the ESD protection devices in Examples 1-2 and Comparative Example 1 obtained as described above.

The electrostatic discharge tests were carried out based on electrostatic discharge immunity tests and noise tests specified in the international standards IEC 61000-4-2, in conformity with the human body model (discharge immunity: 330 ohm; discharged capacity: 150 pF; applied voltage: 8 kV; contact discharge). Specifically, as shown in the electrostatic test circuit in FIG. 12, one terminal electrode of an ESD protection device to be evaluated was grounded. An electrostatic pulse application section was connected to the other terminal electrode of the ESD protection device. A discharge gun was brought into contact with the electrostatic pulse application section so that electrostatic pulses were applied to the discharge gun. The applied electrostatic pulses had a voltage equal to a discharge starting voltage or higher.

The discharge starting voltage is the voltage at which an electrostatic absorption effect is manifested in an electrostatic absorption waveform observed while a voltage of 0.4 kV is increased at 0.2-kV increments during static electricity tests. A peak voltage is the maximum voltage value of the electrostatic pulse obtained when the static electricity tests based on the IEC 61000-4-2 are carried out at a charging voltage of 8 kV. Moreover, a clamping voltage is a voltage value obtained 30 nanoseconds after the wave front value of the electrostatic pulse observed when the static electricity tests based on the IEC 61000-4-2 are carried out based on contact discharge at a charging voltage of 8 kV.

The electrostatic capacitance (pF) was measured at 1 MHz. Furthermore, for discharge immunity, electrostatic tests based on the IEC 61000-4-2 were repeated based on contact discharge at a charging voltage of 8 kV. The number of repetitions was counted until the ESD protection device stopped functioning. The discharge immunity was then evaluated based on the number of repetitions. Table 1 shows the results of the evaluation.

TABLE 1

| | | Comparative Example 1 | Example 1 | Example 2 |
|---|---|---|---|---|
| Electrode | Material | Cu | Cu | Cu |
| | Gap distance ΔG (mm) | 1 | 1 | 3 |
| | Electrode structure | No stage | Two stages | Tow stages |
| Functional layer | Insulating material | $SiO_2$ | $SiO_2$ | $SiO_2$ |
| | Conductive material | Au | Au | Au |
| | Film thickness (um) | 0.6 | 0.6 | 0.6 |
| Peak voltage (V) | | 500 ○ | 500 ○ | 600 ○ |
| Clamping voltage (V) | | 60 ○ | 60 ○ | 70 ○ |
| Discharge starting voltage (kV) | | 1.2 ○ | 1.O ○ | 1.6 ○ |
| Capacitance (pF) | | 0.22 ○ | 0.26 ○ | 0.2 ○ |
| Discharge immunity | | 60 X | 280 ⊚ | 300 ⊚ |

As described above, the ESD protection device and the composite electronic component combined with the ESD protection device according to the present invention have improved durability against repeated use (discharge). Moreover, the ESD protection device and the composite electronic component offer a reduced electrostatic capacitance, a reduced discharge starting voltage, and allow improvements of heat resistance and weather resistance, and allow a further reduction in film thickness, improvement of productivity, and a reduction in costs. The ESD protection device and the composite electronic component can be effectively utilized for various electronic or electric devices and various apparatuses, facilities, systems, and the like including the electronic or electric devices. In particular, the ESD protection device and the composite electronic component can be widely and effectively utilized to prevent possible noise in high-speed differential transmission signal lines and video signal lines.

What is claimed is:

1. An ESD protection device comprising a base having an insulating surface, electrodes disposed on the insulating surface and facing but spaced apart from each other, and a functional layer disposed on at least between the electrodes, wherein the electrodes have a multistage structure in which a gap between the electrodes is narrower toward the base, and wherein the functional layer is a composite in which a conductive inorganic material is discontinuously dispersed in a matrix of an insulating inorganic material.

2. The ESD protection device according to claim 1, wherein the insulating inorganic material is at least one species of material selected from the group consisting of $Al_2O_3$, $TiO_2$, $SiO_2$, ZnO, $In_2O_3$, NiO, CoO, $SnO_2$, $V_2O_5$, CuO, MgO, $ZrO_2$, AlN, BN, and SiC.

3. The ESD protection device according to claim 2, wherein the conductive inorganic material is at least one species of metal selected from the group consisting of C, Ni, Cu, Au, Ti, Cr, Ag, Pd, and Pt, or a metal compound thereof.

4. The ESD protection device according claim 1, wherein the conductive inorganic material is at least one species of metal selected from the group consisting of C, Ni, Cu, Au, Ti, Cr, Ag, Pd, and Pt, or a metal compound thereof.

5. A composite electronic component comprising an inductor device and an ESD protection device that are provided between two magnetic bases, wherein the inductor device comprises an insulating layer comprising resin, and a conductor pattern formed on the insulating layer, wherein the ESD protection device comprises an underlying insulating layer formed on the magnetic base, electrodes disposed on the underlying insulating layer and facing but spaced apart from each other, and a functional layer disposed on at least between the electrodes, wherein the electrodes have a multistage structure in which a gap between the electrodes is narrower toward the magnetic base, and wherein the functional layer is a composite in which a conductive inorganic material is discontinuously dispersed in a matrix of an insulating inorganic material.

6. A composite electronic component comprising a common mode filter layer and an ESD protection device layer that are provided between two magnetic bases, wherein the common mode filter layer comprises:

a first insulating layer and a second insulating layer both comprising resin;

a first spiral conductor formed on the first insulating layer; and a second spiral conductor formed on the second insulating layer; and the ESD protection device layer comprises:

a first ESD protection device connected to one end of the first spiral conductor; and a second ESD protection device connected to one end of the second spiral conductor, and wherein the first and second spiral conductors are formed on respective planes perpendicular to a stacking direction and arranged so as to be magnetically coupled together, and each of the first and second ESD protection devices includes an underlying insulating layer formed on the magnetic base, electrodes disposed on the underlying insulating layer and facing but spaced apart from each other, and a functional layer disposed on at least between the electrodes, and wherein the electrodes have a multistage structure in which a gap between the electrodes is narrower toward the magnetic base.

* * * * *